(12) United States Patent
Aufranc et al.

(10) Patent No.: US 8,317,334 B2
(45) Date of Patent: Nov. 27, 2012

(54) PROJECTOR ALIGNMENT IN A MULTIPLE-PROJECTOR PROJECTION SYSTEM

(75) Inventors: Richard Aufranc, Albany, OR (US); Thomas M. Carrico, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/367,555

(22) Filed: Feb. 7, 2012

(65) Prior Publication Data
US 2012/0133897 A1    May 31, 2012

Related U.S. Application Data

(62) Division of application No. 11/881,057, filed on Jul. 25, 2007, now Pat. No. 8,142,026.

(51) Int. Cl.
*G03B 21/14* (2006.01)
(52) U.S. Cl. ............... 353/48; 353/94; 353/122; 353/69
(58) Field of Classification Search ................... 353/29, 353/42, 46, 48, 69, 94, 121, 122
See application file for complete search history.

(56) References Cited

U.S. PATENT DOCUMENTS
2006/0181685 A1* 8/2006 Hasegawa ................... 353/69
* cited by examiner

*Primary Examiner* — Tony Ko

(57) ABSTRACT

Projector alignment in a multiple-projector projection system is checked by determining a location of at least a portion of a boundary of an image field projected by at least one of the projectors and comparing the determined location of the at least the portion of the image field to a system-calibrated reference location of the at least the portion of the boundary of the image field.

15 Claims, 16 Drawing Sheets

PROJECTOR ALIGNMENT IN A MULTIPLE-PROJECTOR PROJECTION SYSTEM

The present application is a divisional of U.S. patent application Ser. No. 11/881,057, filed on Jul. 25, 2007 now U.S. Pat. No. 8,142,026, wherein the U.S. priority applications are herein incorporated by reference.

BACKGROUND

Multiple projectors are sometimes combined to form multiple-projector systems to increase the brightness of a projected image field and/or to increase the size of a projected image field. For example, to increase the brightness of a projected image field, the image fields of the respective projectors of the system are superimposed (e.g., or stacked) on each other to form a stacked image field. An example of increasing the size of a projected image field involves displaying the image fields of the respective projectors of the system side by side (or tiling the image fields of the respective projectors of the system), e.g., with portions of the respective image fields overlapping, to form a tiled image field, with each projector corresponding to a tile. For some applications, the brightness of each tile of the tiled image field may be increased by stacking the image fields of a plurality of projectors corresponding to that tile.

The projectors of multiple-projector systems are typically aligned with each other to form substantially seamless displays, e.g., so that a line appears substantially continuous across the image fields of the respective projectors. Aligning the respective projectors usually involves executing a rather complex, time-intensive calibration procedure. For example, each projector displays a calibration pattern, and one or more image-capturing devices, such as one or more cameras, record the calibration pattern for each projector. The recorded calibration patterns are then used to create a mapping between the pixels of each projector and where the corresponding pixels land on the screen. The mapping is then used to align the projectors to create the desired display. For example, the projectors are typically aligned to project data only on a portion of their respective image fields that corresponds to an image field that is common to or is an intersection of the image fields of the respective projectors of the system and that contains the desired display. However, projector alignment can shift over time, resulting in degradation of the stacked or tiled image projected by the multiple-projector system. Therefore, it may be necessary to perform a rather time-consuming and complex recalibration of the system.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
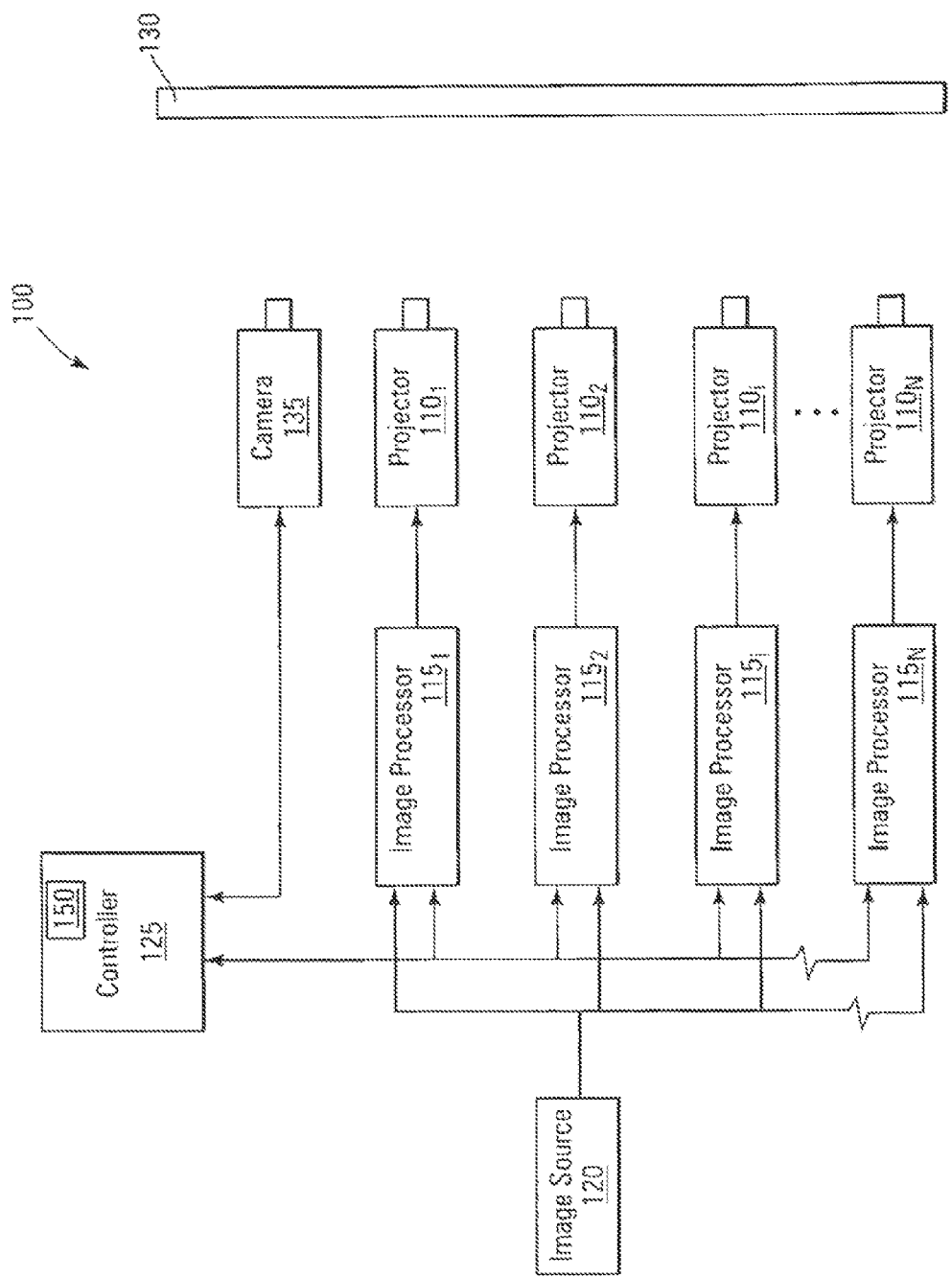
FIG. 1 is a block diagram of an embodiment of a multiple-projector projection system, according to an embodiment of the disclosure.

FIG. 1 is a block diagram of a multiple-projector projection system 100, according to an embodiment. Projection system 100 includes projectors $110_1$ to $110_N$, such as digital projectors, respectively coupled to image processors $115_1$ to $115_N$ for respectively receiving images therefrom. Each of the image processors 115 may receive digital source data from an image source 120, such as a computer, DVD player, a set-top box connected to a direct television satellite link, or a cable television provider, etc., and convert the data into an image field for projection by the respective projector 110.

Each of the image processors 115 is also coupled to a controller 125. For one embodiment, controller 125 may include a personal computer or the like for providing a user interface. Controller 125 is configured to perform calibration routines for aligning the projectors 110. For example, controller 125 may send data corresponding to a calibration pattern to each of the image processors 115, which in turn converts the data into an image field containing the calibration pattern and sends the image field to the respective projector 110. Each of the projectors 110 then projects its image field, containing the calibration pattern, onto a projection screen 130.

One or more image-capturing devices, such as one or more cameras 135, e.g., that may be digital cameras, record the calibration patterns contained in the image fields projected onto screen 130 and transmit data corresponding to the recorded calibration patterns to controller 125. Controller 125 uses the data corresponding to the captured calibration patterns to create a mapping between the pixels of each projector and where the corresponding pixels land on the screen. Based on this mapping, controller 125 instructs the image processors 115 to adjust the data they receive from image source 120 so that the image fields projected by the projectors 110 are properly aligned. This calibration routine establishes the location of each pixel of each image field projected by each of the projectors 110 when the projectors 110, and thus their projected image fields, are properly aligned with each other. Controller 125 stores data corresponding to the image field of each of the aligned projectors. For example, the pixel locations, relative to camera 135, for each aligned projector may be stored in a data file for that projector.

For one embodiment, the image processors 115 include computer-readable instructions for adjusting the data they receive from image source 120. The computer-readable instructions may be stored on a computer-usable media and may be in the form of software, firmware, or hardware. In a hardware solution, the instructions are hard coded as part of a processor, e.g., an application-specific integrated circuit (ASIC) chip, a field programmable gate array (FPGA), etc. In a software or firmware solution, the instructions are stored for retrieval by an image processor 115.

Figure 2:
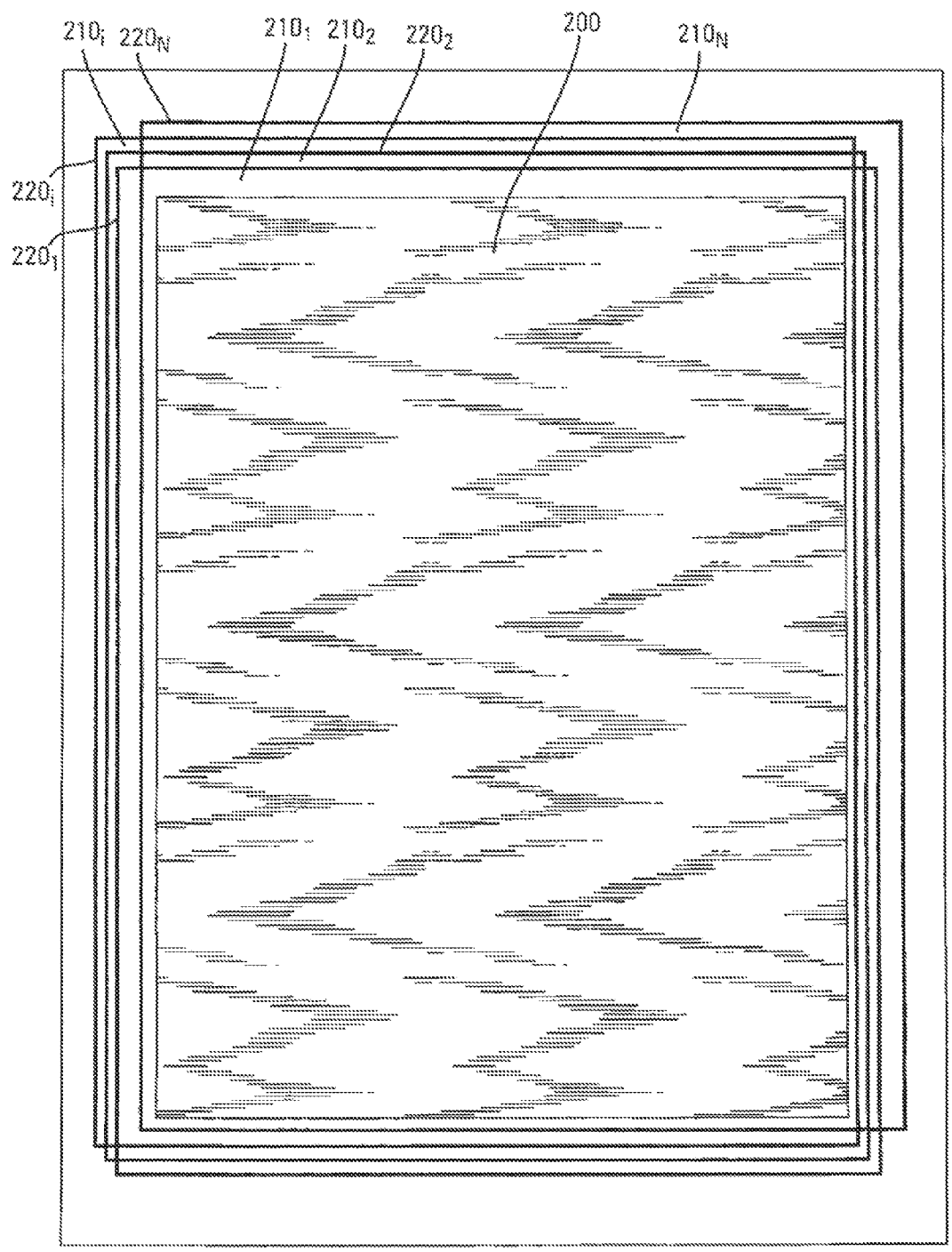
FIG. 2 is a digital image illustrating an embodiment of a stacked image field, according to another embodiment of the disclosure.

FIG. 2 is a view of a stacked image field 200, e.g., projected on screen 130, according to another embodiment. Stacked image field 200 includes component image fields $210_1$ to $210_N$ superimposed on each other by projectors $110_1$ to $110_N$, respectively. For example, stacked image field 200 may be formed by superimposing the image fields 210 respectively projected by the projectors 110 on screen 130 on each other such that stacked image field 200 is brighter than each of the component image fields 210. Note that the brightness of each of the component image fields 210 is additive. The component image fields 210 may be aligned with each other according to the calibration routine described above.

Marks $220_1$ to $220_N$ may be respectively superimposed on the entire boundaries of component image fields $210_1$ to $210_N$ to denote (or identify) the boundaries to facilitate the determination of the location of boundaries, according to an embodiment, as discussed in detail below. Aligning the component image fields 210 establishes the locations of the image fields 210 and their respective boundaries, e.g., with respect to camera 135. Note that the pixel locations, including pixel locations on the boundaries, relative to the camera, for each projector of an aligned projector system, such as projector system 100 in FIG. 1, may be stored in a data file for that projector. Hereinafter, locations of portions of the boundary, e.g., with respect to camera 135, of the image field of each projector of an aligned projectors system may be referred to as system-calibrated reference locations of the respective portions of the boundary of that image field. Note that marks 220 are not required for establishing the locations of the boundaries during the calibration, but may be used to establish the locations of the boundaries at various times after the calibration, according to embodiments discussed below.

Although the boundaries, denoted by marks 220, are offset with respect to each other in FIG. 2, for other embodiments, the respective boundaries may be coincident or substantially coincident. Note that when the boundaries are coincident marks 220 will be coincident. Stacked image 200 is common to or is an intersection of the component image fields 210. Based on the calibration routine that aligns projectors 110, and thus their respective image fields 210, controller 125 instructs the image processors 115 respectively coupled to projectors 110 (FIG. 1) to adjust the data they receive, e.g., from image source 120, so that the respective projectors 110 project images, corresponding to the data, only onto the portions of their respective image fields 210 that correspond to stacked image field 200, as shown in FIG. 2. Note that the remaining portions of the image fields 210 that lie outside of the boundaries of stacked image field 200 may be empty or blank.

Figure 3:
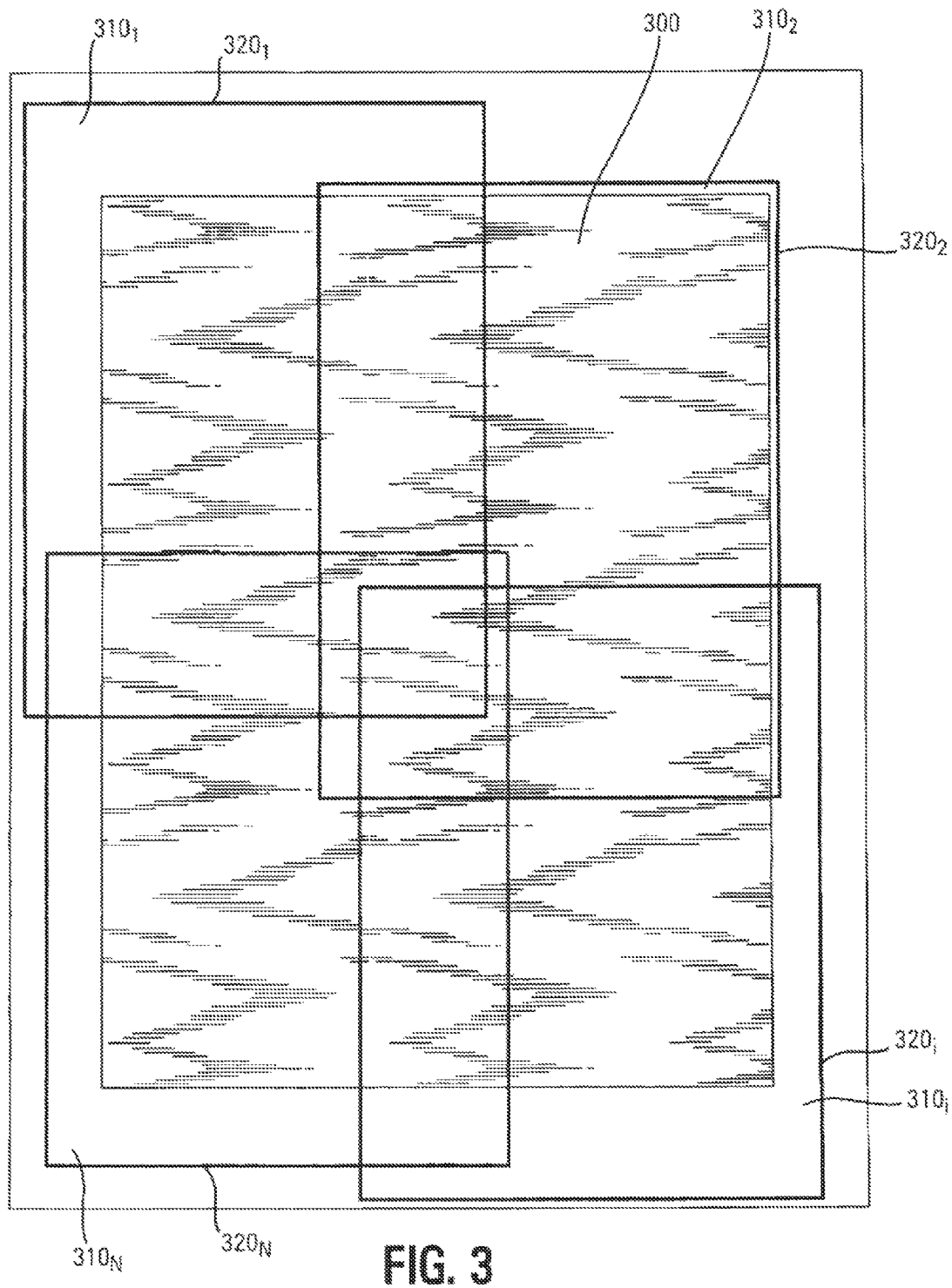
FIG. 3 is a digital image illustrating an embodiment of a tiled image field, according to another embodiment of the disclosure.

FIG. 3 illustrates a tiled image field 300, e.g., projected on screen 130, according to another embodiment. Tiled image field 300 includes component image fields $310_1$ to $310_N$ projected side by side by projectors $110_1$ to $110_N$, respectively. Note that for one embodiment, image fields 310 overlap each other, as shown in FIG. 3. The component image fields 310 may be aligned with each other according to the calibration routine described above. For one embodiment, each of the component image fields 310 may be a stacked image field, e.g., as previously described in conjunction with FIG. 2 for stacked image field 200. For example, each of the component image fields 310 may be formed by one or more projectors. The component image fields of each stacked component image field may be aligned with each other according to the calibration routine described above.

Marks $320_1$ to $320_N$ may be respectively superimposed on the entire boundaries of component image fields $310_1$ to $310_N$ to denote (or identify) the boundaries to facilitate the determination of the location of boundaries, according to an embodiment, as discussed in detail below. Aligning the component image fields 310 establishes the locations of the image fields 310 and their respective boundaries 320, e.g., with respect to camera 135. For example, aligning the component image fields 310 establishes the system-calibrated reference locations of portions of the boundary of each of the image fields 310. Note that the pixel locations, including pixel locations on the boundaries, e.g., relative to the camera, for each projector of an aligned projector system, such as projector system 100 in FIG. 1, may be stored in a data file for that projector. Also note that marks 320 are not required for establishing the locations of the boundaries during the calibration, but may be used to establish the locations of the boundaries at various times after the calibration, according to embodiments discussed below.

For one embodiment, controller 125 performs the previously-described calibration routines in response to computer-readable instructions. In addition, controller 125 performs methods in accordance with embodiments of the present disclosure in response to computer-readable instructions, as described below. The computer-readable instructions are stored on a computer-usable media 150 of controller 125 (FIG. 1) and may be in the form of software, firmware, or hardware. In a hardware solution, the instructions are hard coded as part of a processor, e.g., an application-specific integrated circuit (ASIC) chip, a field programmable gate array (FPGA), etc. In a software or firmware solution, the instructions are stored for retrieval by controller 125. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Other computer-usable media may include flash memory cards (e.g., CompactFlash available from SanDisk Corporation, Sunnyvale, Calif., USA, and Memory Stick available from Sony Corporation, Japan), floppy disks, compact discs, Universal Serial Bus (USB) drives, etc.

One problem with multiple-projector projection systems, such as multiple-projector projection system 100 of FIG. 1, is that the projector alignment can shift over time, which can degrade the quality of the image field, e.g., stacked and/or tiled, produced by combining the projectors of the multiple-projector projection system. Sometimes the problem of projector misalignment may be addressed by repeating the calibration routines at predetermined time intervals or when one or more of the projectors are subjected to a disturbance. However, repeating the calibration routines is time consuming and can remove content from the screen if performed during normal operation of the multiple-projector projection system, e.g., when the system is being used to display source data from an image source, such as image source 120.

Figure 4:
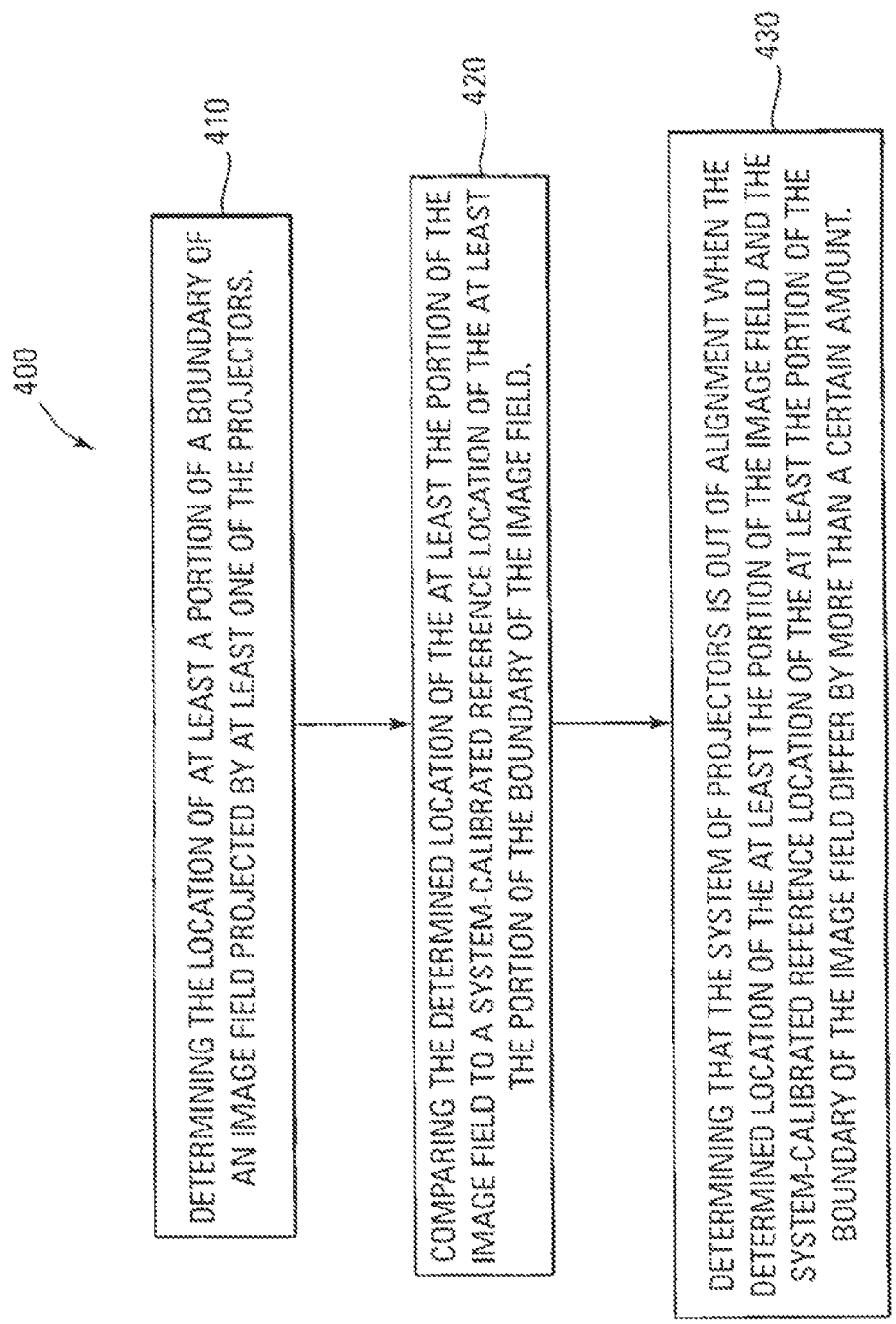
FIG. 4 presents a flow chart of an embodiment of a method for checking the alignment of a projector of a multiple-projector system, according to another embodiment of the disclosure.

FIG. 4 presents a flow chart of a method 400 for checking the alignment of at least one projector of a multiple-projector system, such as at least one of projectors 110 of multiple-projector projection system 100 of FIG. 1, according to an embodiment. At block 410, the location of at least a portion of a boundary of an image field projected by at least one of the projectors is determined. For one embodiment, this means determining the location of the entire boundary of the respective image field, such as the location of a boundary of an image field 210, as shown in FIG. 2, or the location of a boundary of an image field 310, as shown in FIG. 3. For one embodiment, determining the location of the boundary involves denoting the boundary, e.g., by superimposing a marks on the boundaries, as shown in FIGS. 5-8.

Figure 5:
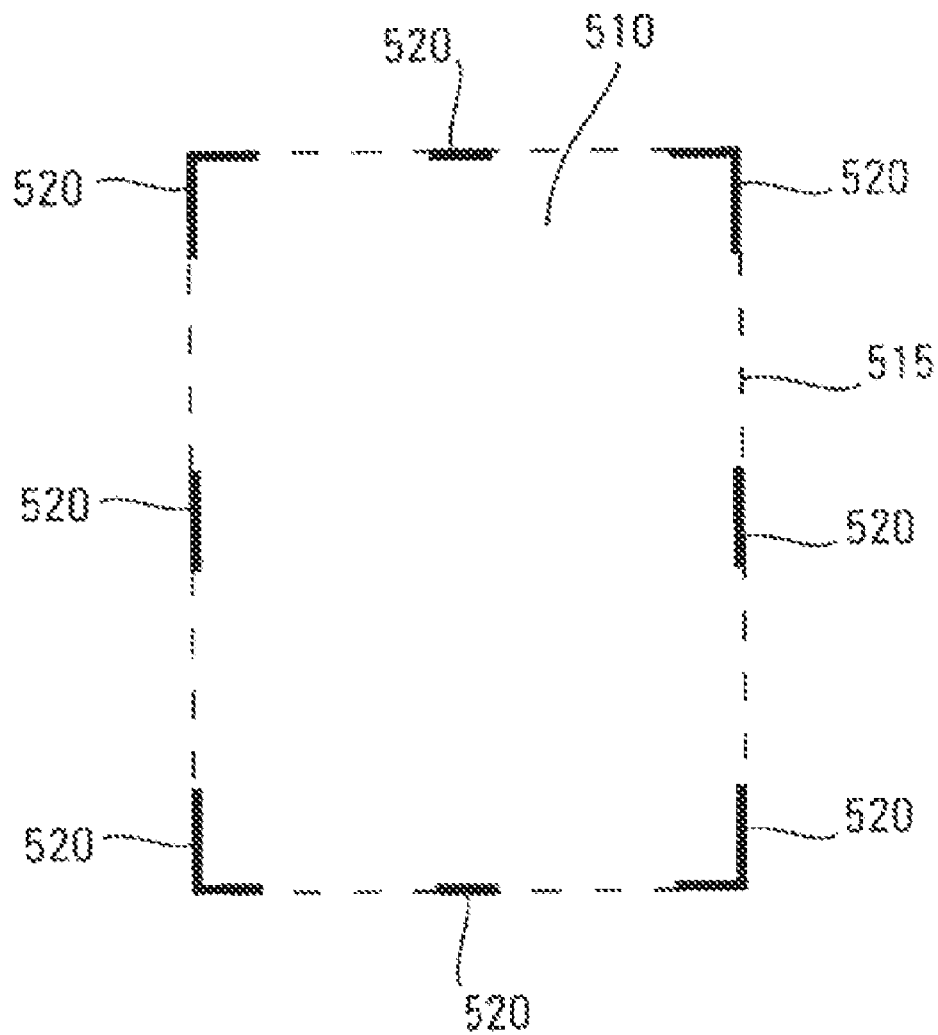
FIG. 5 illustrates an embodiment of an image field with one or more marks superimposed on a boundary thereof, according to another embodiment of the disclosure.
Figure 6A:
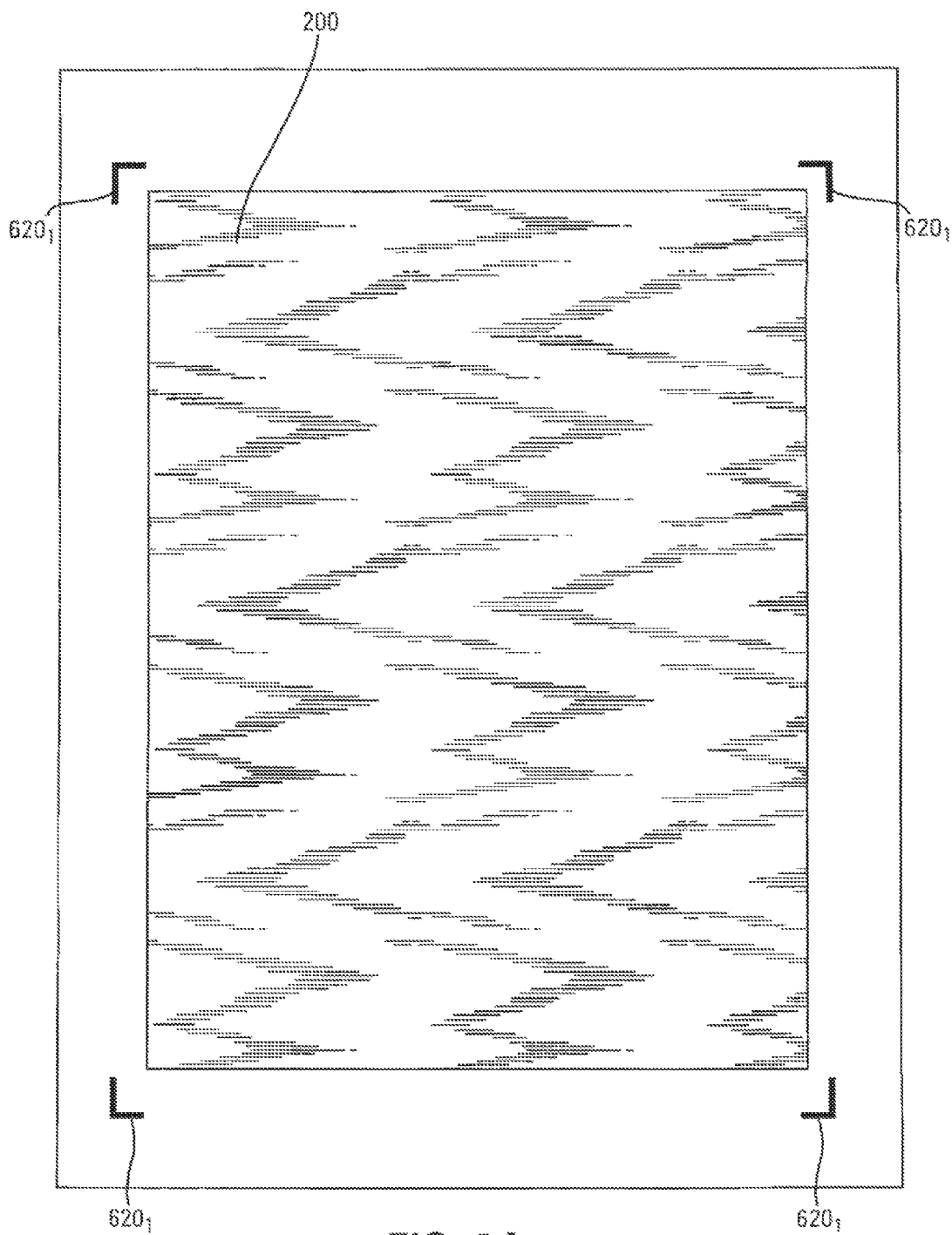
FIGS. 6A-6D illustrate sequentially superimposing marks on the boundaries of component image fields of a stacked image field, according to another embodiment of the disclosure.
Figure 6B:
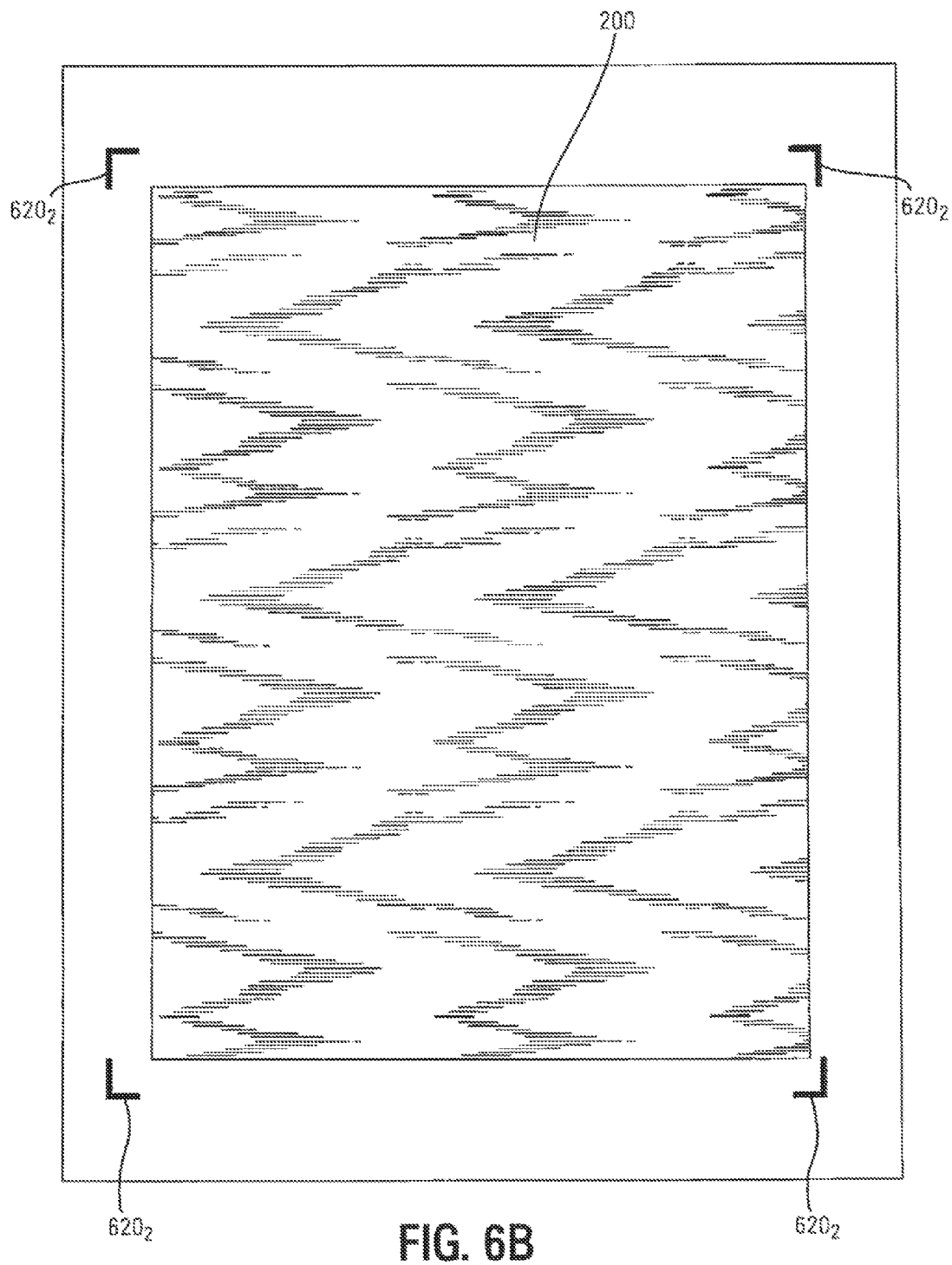
Figure 6C:
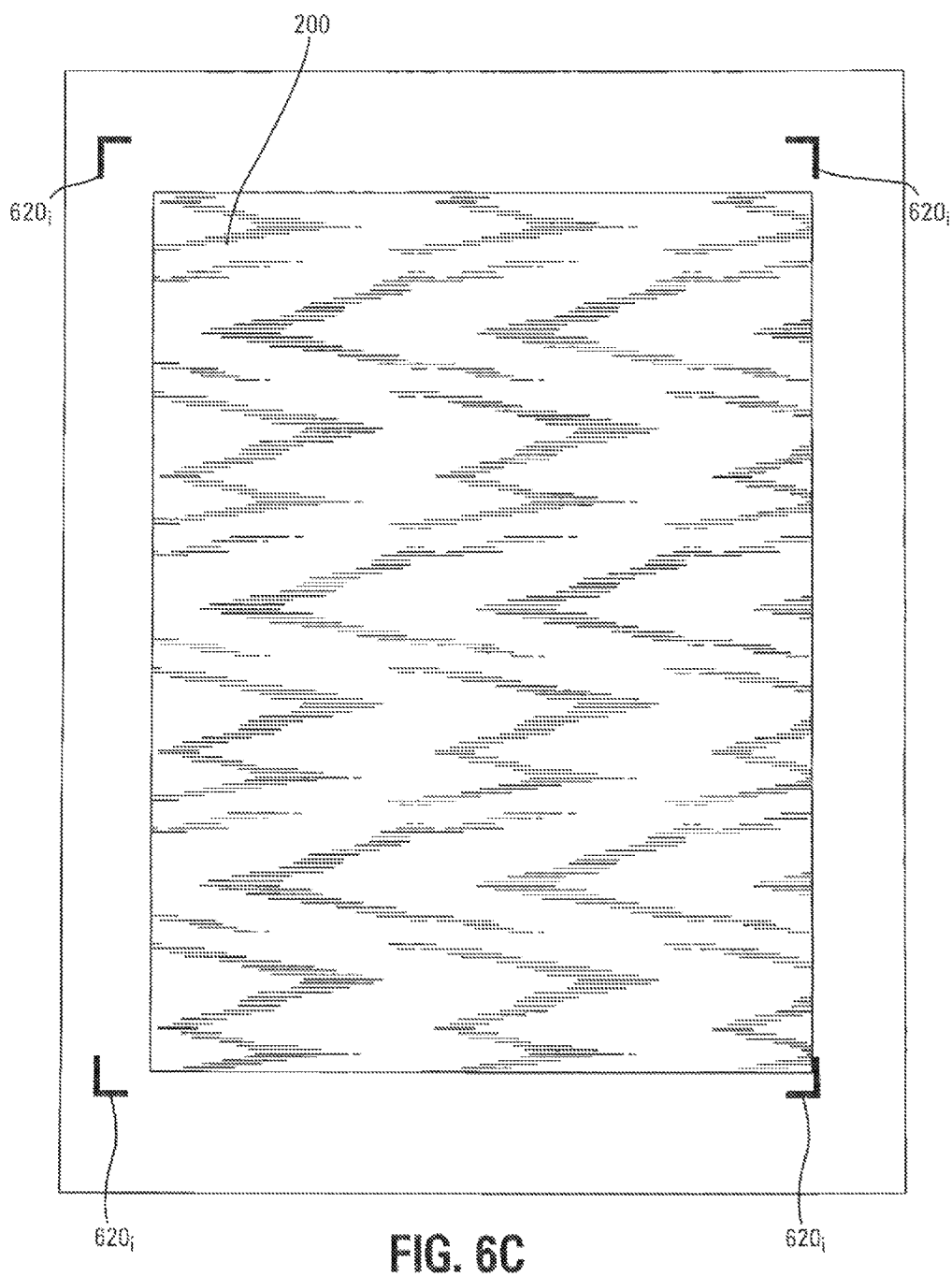
Figure 6D:
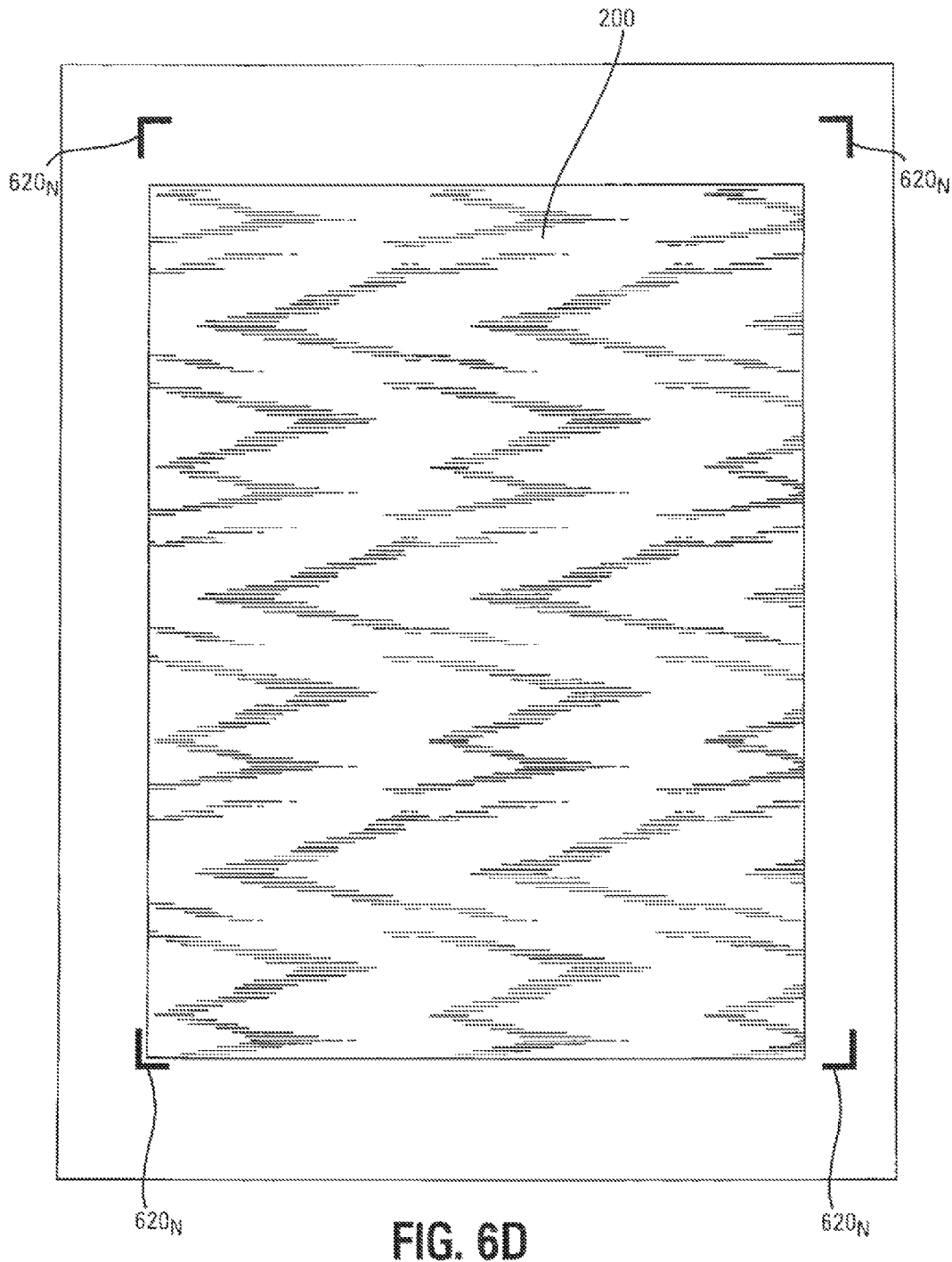
Figure 7A:
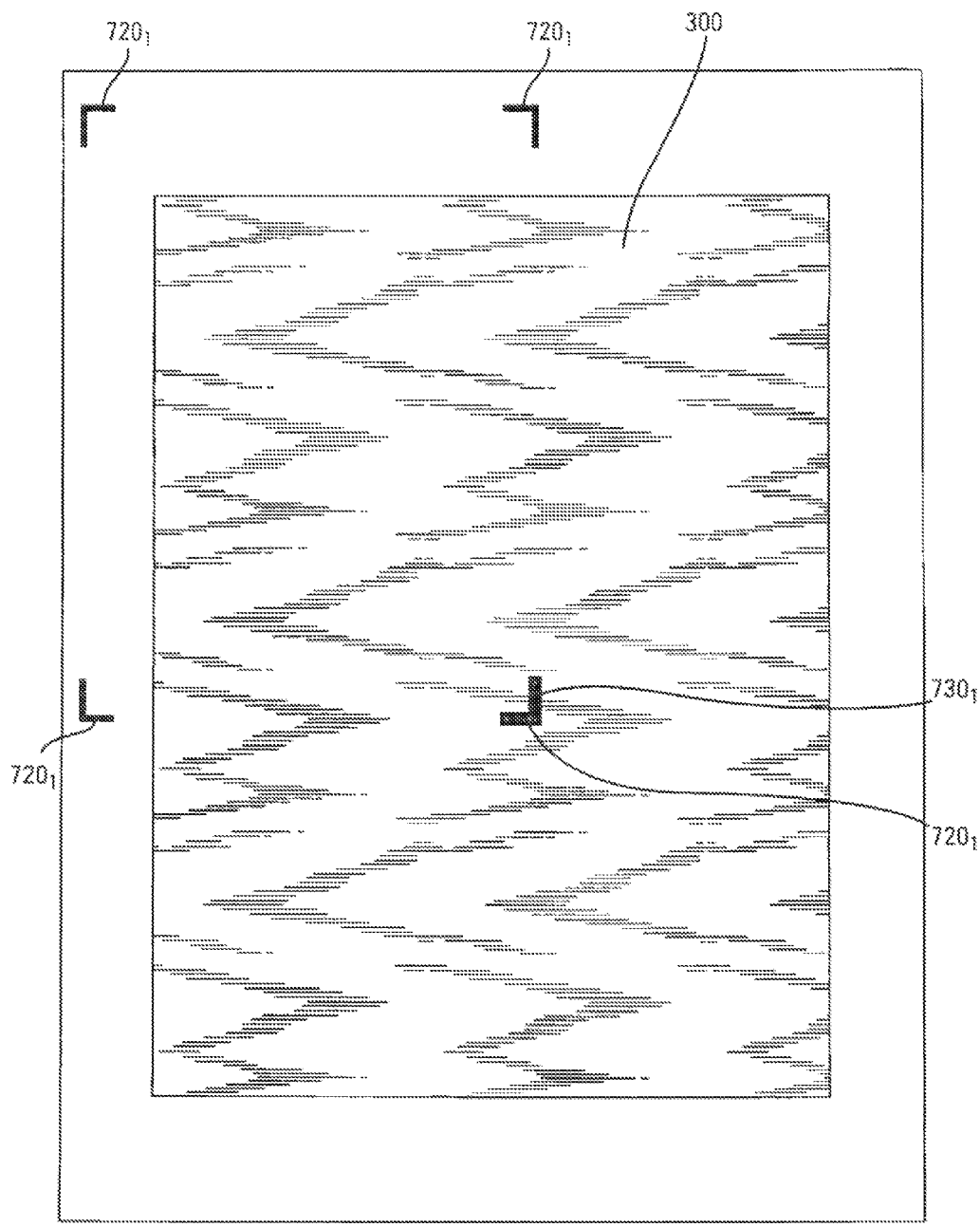
FIGS. 7A-7D illustrate sequentially superimposing marks on the boundaries of component image fields of a tiled image field, according to another embodiment of the disclosure.
Figure 7B:
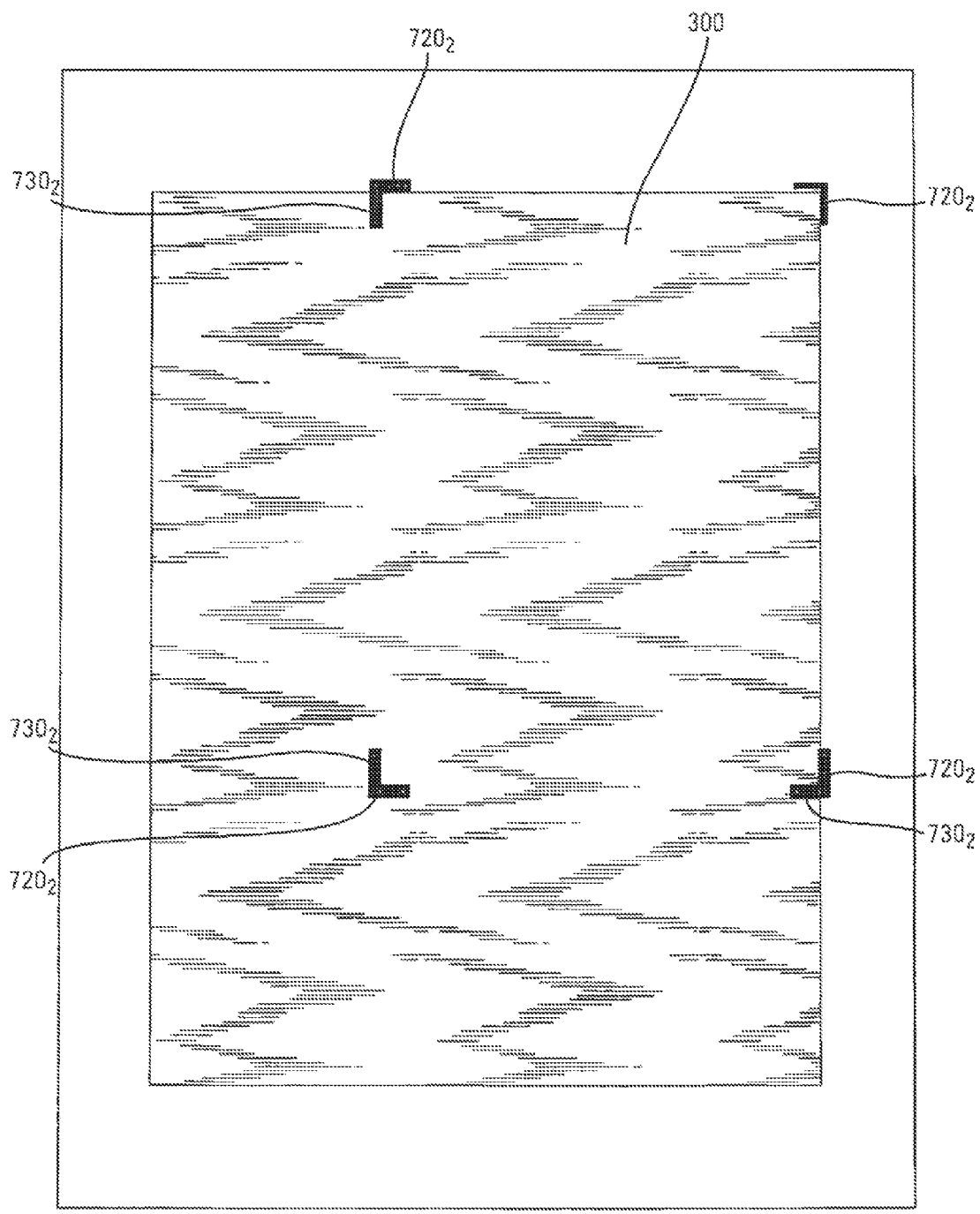
Figure 7C:
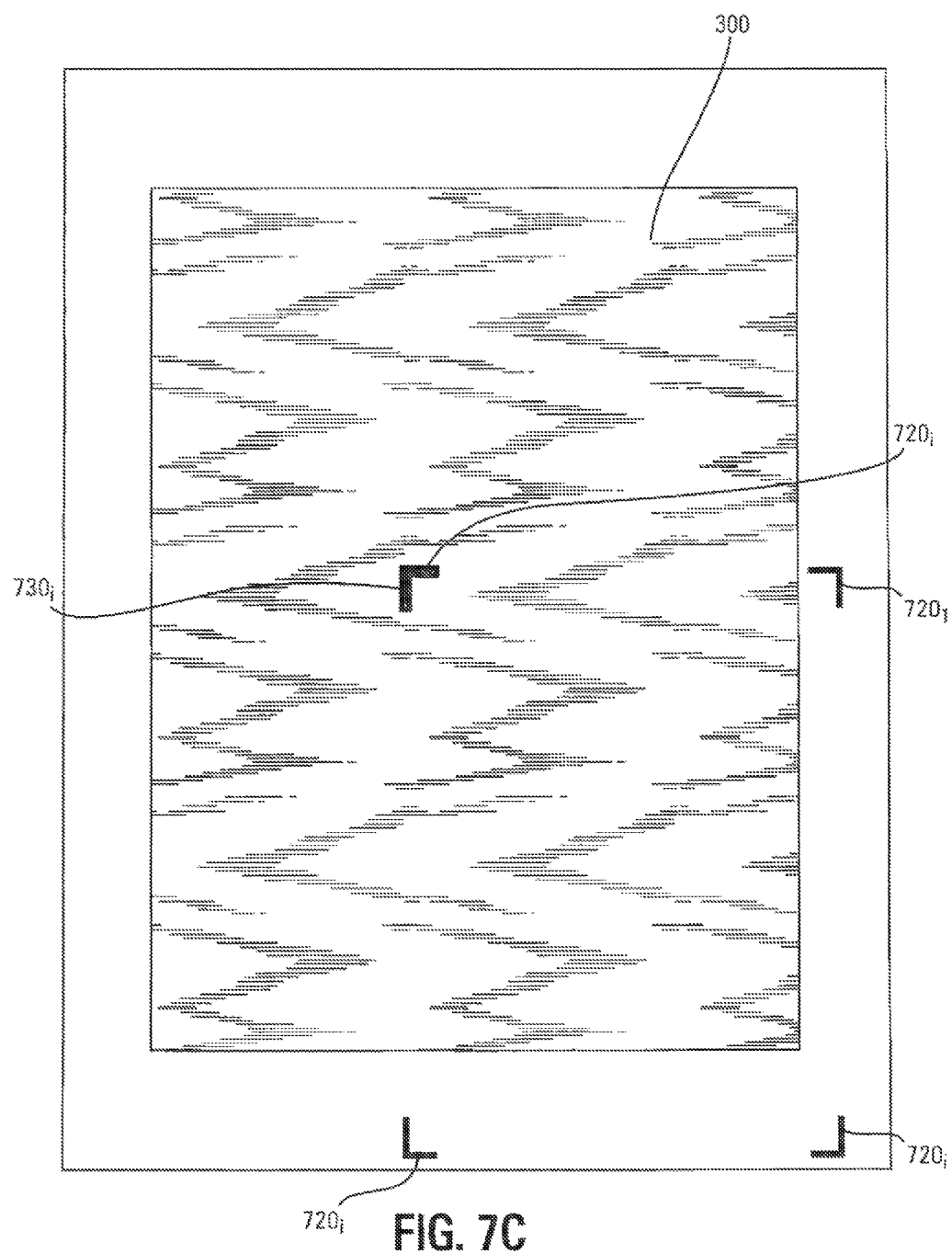
Figure 7D:
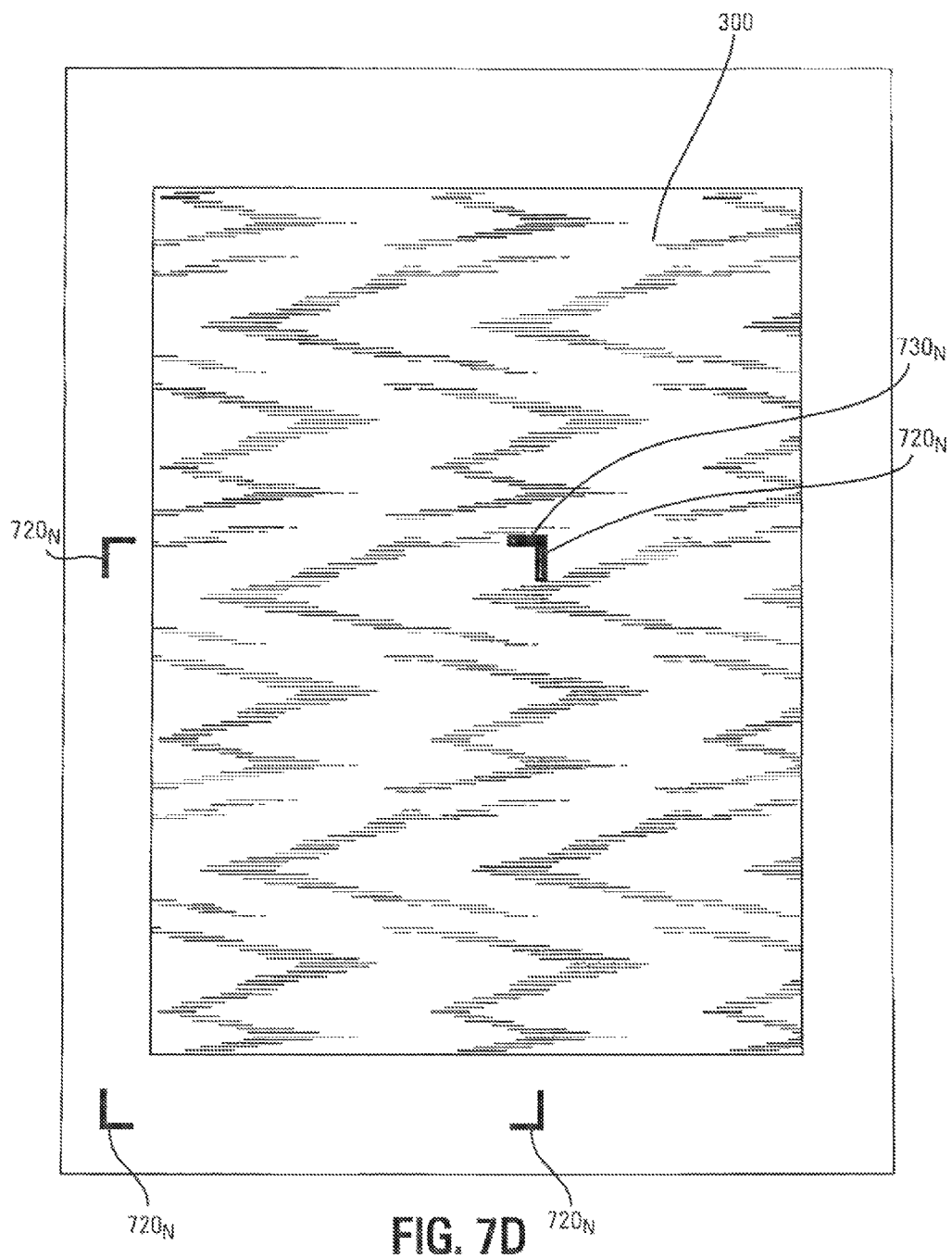

FIG. 5 presents an example of an image field 510, e.g., analogous to an image field 210 of FIG. 2 or an image field 310 of FIG. 3. Image field 510 includes a boundary 515, shown as a dashed line to indicate that the boundaries of the image fields of the individual projectors are not visible. For one embodiment, one or more marks 520 may be respectively superimposed on one or more of the corners of boundary 515 in order to denote boundary 515, as shown in FIG. 5. Alternatively, one or more marks 520 may be respectively superimposed on one or more sides of boundary 515, as shown in FIG. 5. For other embodiments, one or more marks may be respectively superimposed on the corners and sides of the boundary 515, or a mark, such as marks 220 of FIG. 2 or marks 320 of FIG. 3, may be superimposed on the entire boundary 515 in order to denote the boundary.

The marks may be superimposed on the boundary in response to controller 125 of FIG. 1 sending data, corresponding to the marks, to an image processor 115 coupled to the projector 110 projecting the image field. The image processor 115 in turn superimposes the marks on the boundary of the image field in response to receiving the data from the controller, and the projector 110 coupled thereto projects the image field, with the marks thereon, onto the screen. For some embodiments, the marks are displayed for a certain (e.g., predetermined) length of time that is short enough so as not to distract from the images in the image field, but long enough to be recorded by an image-capturing device, such as camera 135 of FIG. 1.

The marks may be bold line segments, as shown in FIG. 5, that are sufficiently large to be captured by the camera. Alternatively, the marks may be dots that are sufficiently large to be captured by an image capturing device, such as camera 135. For one embodiment, the marks may be a different color, shade, and/or brightness than images displayed in the image field or the background of the image field so as to sufficiently contrast from the image field in order to be captured by the image capturing device, e.g., the marks may be black, white, or colored. For other embodiments, different colored marks are respectively used for the image fields projected by different projectors so as to color code the respective projectors. This is advantageous when the projectors are configured to superimpose their image fields on each other to form a stacked image field, as shown in FIG. 2.

FIGS. 6A-6D illustrate sequentially superimposing marks 620 on the boundaries of component image fields 210 of the stacked image field 200 of FIG. 2, according to another embodiment. For example, marks $620_1$, $620_2$, $620_i$, and $620_N$ respectively of FIGS. 6A, 6B, 6C, and 6D are respectively superimposed on the image fields $210_1$, $210_2$, $210_i$, and $210_N$ of FIG. 2, e.g., at the corners of the boundaries of the image fields $210_1$, $210_2$, $210_i$, and $210_N$. For one embodiment, marks $620_1$, $620_2$, $620_i$, and $620_N$ respectively have different colors. Sequentially superimposing marks on the boundaries of the respective component image fields when the component image fields are stacked facilitates identifying which marks correspond to which component image field, especially when the boundaries of the component image fields are substantially coincident. Note that additional marks may be superimposed on the sides of boundaries of each of the image fields of FIGS. 6A-6D. Alternatively, a single mark, such as a mark 220 of FIG. 2, may be sequentially superimposed on the respective component image fields of FIGS. 6A-6D.

Marks may also be sequentially superimposed on the boundaries of the component image fields when the image fields are tiled, as shown in FIGS. 7A-7D, which illustrate sequentially superimposing marks 720 on the boundaries of component image fields 310 of the tiled image field 300 of FIG. 3, according to another embodiment. For example, marks $720_1$, $720_2$, $720_i$, and $720_N$ respectively of FIGS. 7A, 7B, 7C, and 7D are respectively superimposed on the boundaries of the image fields $310_1$, $310_3$, $310_i$, and $310_N$ of FIG. 3. e.g., at the corners of the boundaries of the image fields $310_1$, $310_3$, $310_i$, and $310_N$. For one embodiment, marks $720_1$, $720_2$, $720_i$, and $720_N$ respectively have different colors. Note that additional marks may be superimposed on the sides of boundaries of each of the image fields of FIGS. 7A-7D. Alternatively, a single mark, such as a mark 320 of FIG. 3, may be sequentially superimposed on the respective component image fields of FIGS. 7A-7D.

Figure 8:
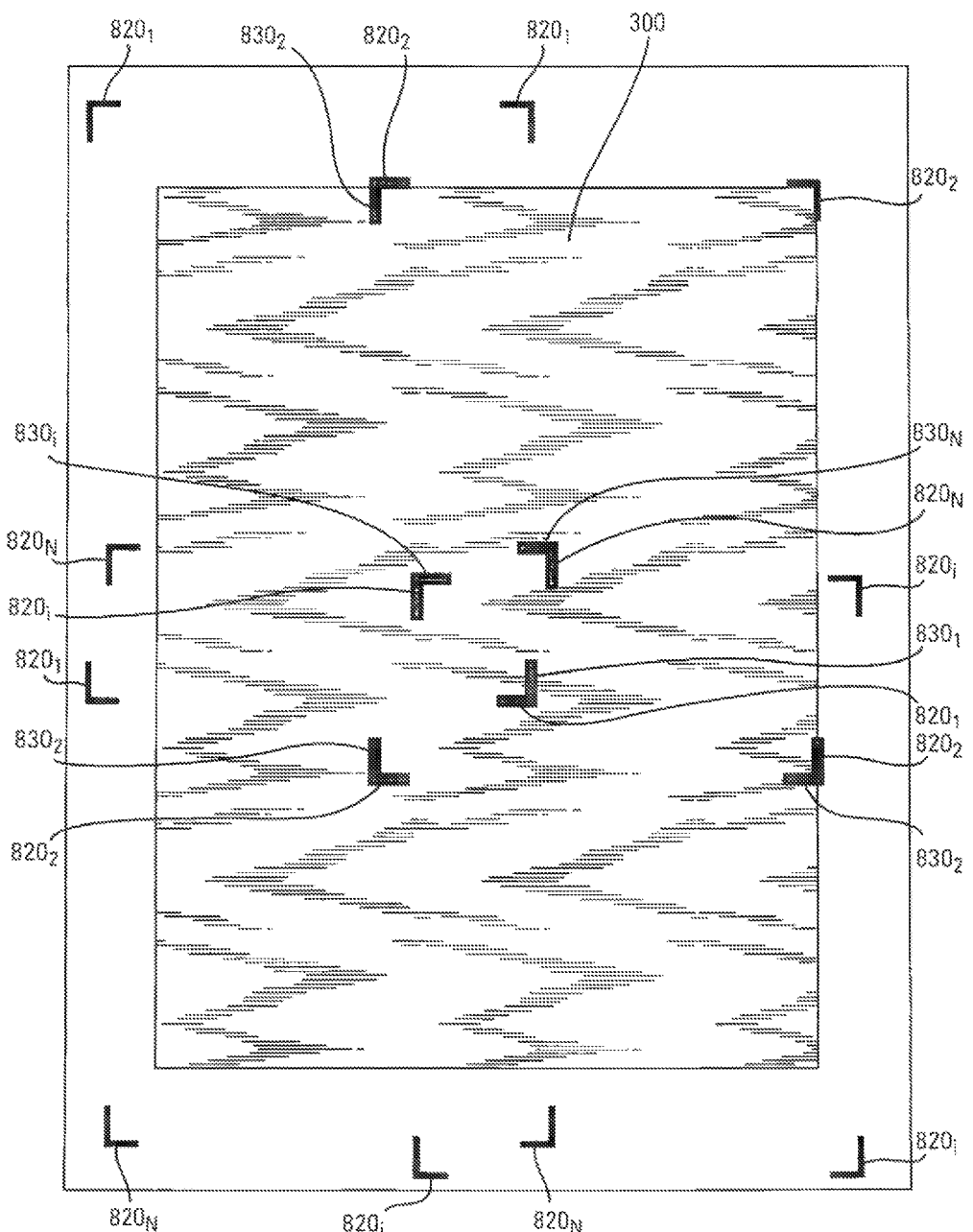
FIG. 8 illustrates substantially concurrently superimposing marks on each of the component image fields of a tiled image field, according to another embodiment of the disclosure.

For other embodiments, the marks may be superimposed on the boundaries of each of the component image fields concurrently or substantially concurrently when the image fields are tiled. For example, FIG. 8 illustrates concurrently or substantially concurrently superimposing marks 820 on the corners of the boundaries of component image fields 310 of the tiled image field 300 of FIG. 3, according to another embodiment. For example, marks $820_1$, $820_2$, $820_i$, and $820_N$ are respectively superimposed on the corners of the boundaries of the image fields $310_1$, $310_3$, $310_i$, and $310_N$ of FIG. 3. For one embodiment, marks $820_1$, $820_2$, $820_i$, and $820_N$ respectively have different colors. Note that additional marks may be superimposed on the sides of boundaries of each of the image fields of FIG. 8. Alternatively, a single mark, such as a mark 320 of FIG. 3, may be concurrently or substantially concurrently superimposed on each of the component image fields of FIG. 8.

For one embodiment, a contrast border may be superimposed on the boundary of the marks when those marks are superimposed on the image formed by the system of the projectors. For example, a contrast border 730 may be superimposed on the boundaries of marks 720, when one or more of those marks 720 are superimposed on the tiled image 300, as shown in FIGS. 7A-7D. For example, contrast borders $730_1$, $730_2$, $730_i$, and $730_N$ may be respectively superimposed on the boundaries of marks $720_1$, $720_2$, $720_i$, and $720_N$ respectively of FIGS. 7A-7D when one or more of marks $720_1$, $720_2$, $720_i$, and $720_N$ are sequentially superimposed on the tiled image 300, as shown in FIGS. 7A-7D. Similarly, when one or more of marks $820_1$, $820_2$, $820_i$, and $820_N$ are substantially concurrently or concurrently superimposed on the tiled image 300, contrast borders $830_1$, $830_2$, $830_i$, and $830_N$ may be respectively superimposed on the boundaries of those marks 820₁, 820₂, 820ᵢ, and 820ₙ, as shown in FIG. 8.

The contrast borders may be black or of a color that contrasts with color of the respective mark on whose boundary the contrast border is disposed. The contrast borders may be superimposed on the boundaries of respective ones of the marks in response to controller 125 of FIG. 1 sending data, corresponding to the contrast border, to an image processor 115 coupled to the projector 110 projecting the image field on whose boundary one or more of the marks are superimposed. The image processor 115 in turn superimposes a contrast border on the boundaries of respective ones of the one or more marks in response to receiving the data from the controller, and the projector 110 coupled thereto projects the image field, with the marks thereon and the with the contrast borders on respective ones of the marks, onto the screen.

Note that portions of the boundaries of the component image fields of FIGS. 6-8 that are not denoted by a mark are not visible. Also note that the marks may be superimposed on the image fields during normal operation of the projection system, e.g., while images are being displayed, such as while a movie or the like is being projected, as shown in FIGS. 6-8.

The location of at least a portion of the boundary may be determined by determining the location of one or more of the marks superimposed on the image field. This may be accomplished using camera 135. e.g., the same camera that was used in the calibration that was used to align the projectors, to record the marks. Data corresponding to the recorded marks is sent to controller 125, and controller 125 determines the locations, e.g., pixel locations, of the portions of the boundary denoted by the one or more marks, e.g., relative to camera 135. For example, the pixel locations of the corners denoted by the marks in FIGS. 6-8 may be determined in this way.

At block 420, the determined location of the at least the portion of the image field is compared, e.g., at controller 125, to a system-calibrated reference location of the at least the portion of the boundary of the image field. For example, the location of an upper left corner 905 of an image field 910 of FIG. 9, e.g., relative to camera 135, is compared to a system-calibrated reference location of an upper left corner 905' of an image field 910' of FIG. 9. Note that the locations of like portions of the boundary of the image field, such as the upper left corners are compared. Also note that a mark 920 superimposed on corner 905 may denote corner 905. Camera 135 may record mark 920 and send data corresponding to mark 920 to controller 125, which in turn determines the location of corner 905 based on the mark 920.

Image fields 910 and 910' are projected by the same projector. Image field 910' corresponds to when the projector is in calibrated alignment with the remaining projectors of the projector system and is thus a system-calibrated reference image field that may be stored by controller 125. Image field 910 is projected at some time after the calibration was performed.

At block 430, it is determined that the system of projectors is out of alignment when the determined location of the at least the portion of the image field and the system-calibrated reference location of the at least the portion of the boundary of the image field differ by more than a certain (e.g., predetermined) amount. For example, when the distance D between corners 905 and 905' exceeds a certain (e.g., predetermined) distance, the projector that projected image fields 910 and 910' is out of alignment and thus the system of projectors is out of alignment. For some embodiments, the certain distance may be zero or substantially zero.

Note that determining that the location of one portion of the boundary of an image field is different from the system-calibrated reference location of that portion may be sufficient to conclude that the system of projectors is out of alignment. For example, determining that the locations of corners 905 and 905' are different may be sufficient to conclude that the projector is out of alignment. However, if it is determined that the distance D between corners 905 and 905' is less than or equal to the certain distance, it cannot necessarily be concluded that the system of projectors is aligned, e.g., it is possible that the image field might have rotated about corner 905 or that portions of the boundary between the corners may have bowed in or out without the corners moving.

Therefore, to determine whether a projector is aligned, it may be necessary to compare the locations of at least two portions of the boundary of the image field to the system-calibrated reference locations of those two portions. For example, to conclude that the projector is aligned when it is determined that the distance D between corners 905 and 905' is less than or equal to the certain distance, for example, it may be necessary to also determine whether distance between the location of lower right corner 907 of image field 910 and the system-calibrated reference location of lower right corner 907' of image field 910' are less than or equal to the certain distance. If the distance between corners 907 and 907' is less than or equal to the certain distance when it is determined that the distance D between corners 905 and 905' is less than or equal to the certain distance, then the projector is aligned. Otherwise, the projector system is out of alignment.

Figure 9:
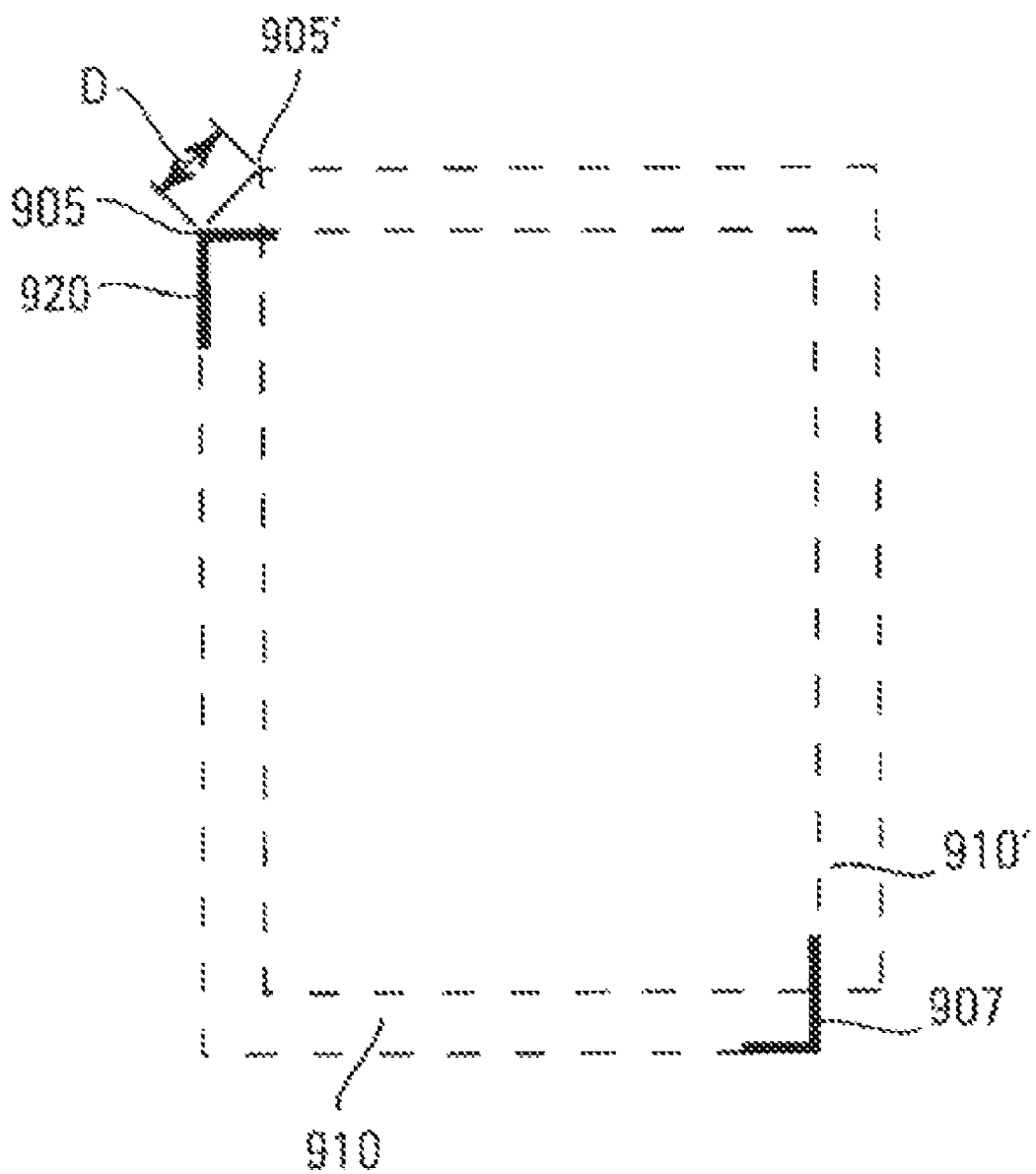
FIG. 9 illustrates an image field projected by a projector in alignment with other projectors of a multiple-projector system and an image field projected by that projector after that projector has been moved from alignment, according to another embodiment of the disclosure.

Although a projector may be in alignment when the locations of two portions of a boundary differ from the system-calibrated locations of those portions of the boundary by less than or equal to the certain amount when an image field moves by a translation, as shown in FIG. 9. the locations additional portions of the boundary may need to be compared to the system-calibrated locations of those additional portions to determine whether the boundary has moved by distortion, e.g., whether the portions of the boundary between the corners are bowed in or out. For such situations, it may be useful to denote the entire boundary be superimposing a mark on the entire boundary, as shown in FIGS. 2 and 3, determine the locations of a locus of points on the entire boundary, and compare the locations of each of the locus of boundary points to the system-calibrated locations of each of the locus of boundary points. Instead of considering the entire boundary, locations of portions of boundary 515 of FIG. 5 denoted by each of marks 520 may compared to the system-calibrated locations of each of those portions.

Figure 10:
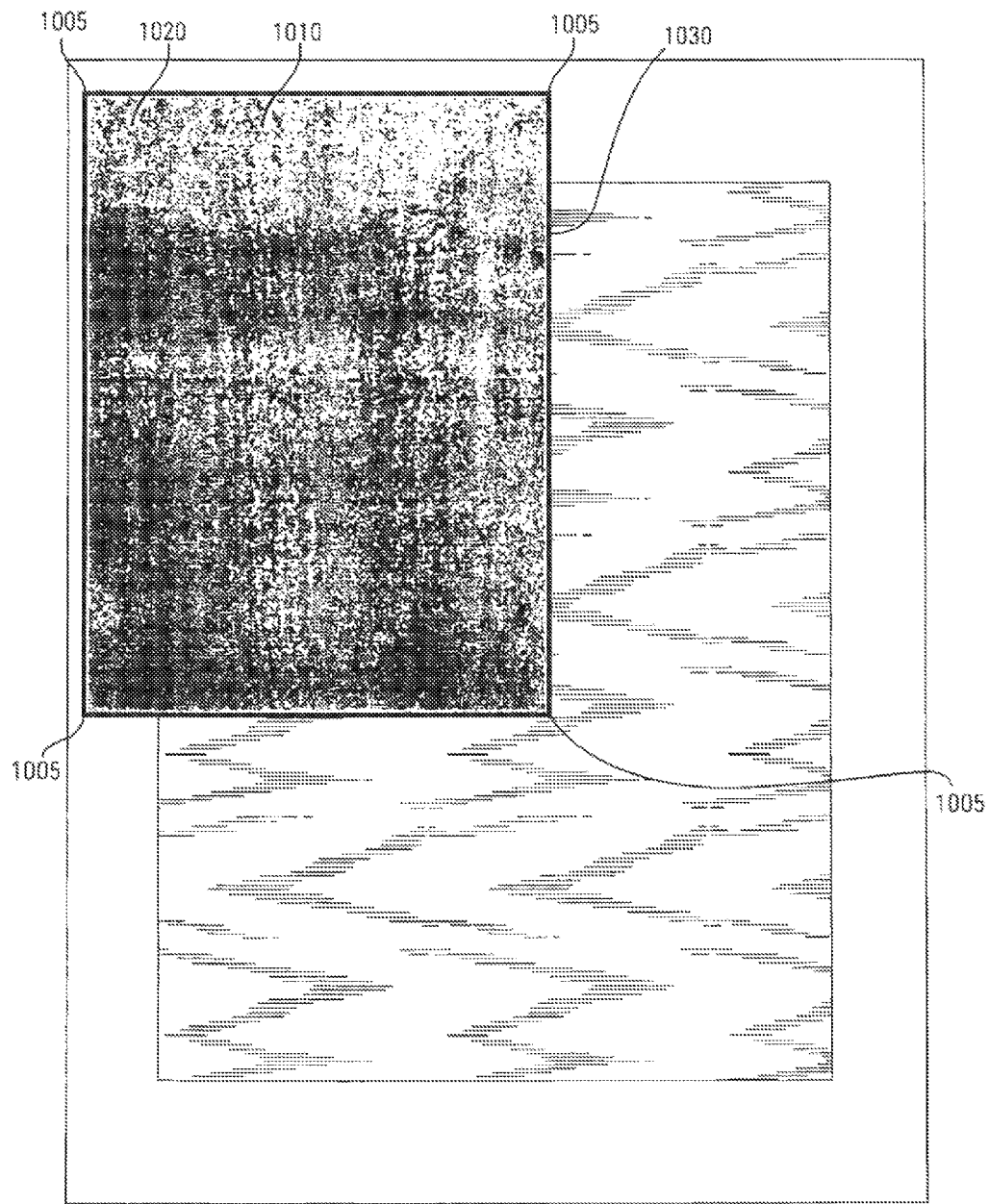
FIG. 10 illustrates superimposing a single mark on an entire image field so that the mark substantially fills an interior of the image field, according to another embodiment of the disclosure.

For another embodiment, the boundary of an image field, e.g., an image field 1010, of each projector of the projector system may be determined by superimposing a single, e.g., colored, mark 1020 on the entire image field 1010 so that the mark fills the interior of the image field 1010 as shown in FIG. 10, according to another embodiment. Image field 1010 is analogous to an image field 210 of FIG. 2 and or an image field 310 of FIG. 3. Note that the edges and corners of mark 1020 denote the boundary. Alternatively. image field 1010 may be stippled, e.g., filled with a plurality of dots or the like having a number density sufficient to denote the boundary. Sufficiently dense cross-hatching may also be used to fill image field 1010. For other embodiments, different colors of fill may be used for the image fields projected by the respective projectors. Note that for some embodiments a contrast border 1030 may be superimposed on the boundary of mark 1020, e.g., at least on portions of the boundary that are superimposed on the image formed by the system of the projectors.

Camera 135 then records filled-in image field 1010 and transmits the data corresponding thereto to controller 125, which in turn identifies locations of one or more portions of the boundary, e.g., relative to camera 135, such as one or more corners 1005, one or more points along portions of the boundary between the corners, e.g., a locus of points on one or more sides of the boundary, etc. Note that the image fields may be filled sequentially when the image fields are stacked or tiled.

For one embodiment, multiple-projector projection system 100 is recalibrated, e.g., using the calibration procedure previously described. in response to determining that one projector 110 of the multiple-projector projection system 100 (FIG. 1) is out of alignment. Based on this, for some embodiments, it may be advantageous to check the alignment of projectors 110 of the multiple-projector projection system 100 one at a time until a misaligned projector 110 is identified, at which time it is concluded that system 100 should be recalibrated without checking any remaining projectors 110. For example, after a single projector 110 is checked, and it is concluded that that projector 110 is aligned another projector 110 is checked. This proceeds until a misaligned projector is identified or until all of the projectors are checked without identifying a misaligned projector 110. If no misaligned projectors 110 are identified, it is determined that multiple-projector projection system 100 is aligned and no calibration needs to be performed.

For embodiments where projectors 110 are configured to project a stacked image field. such as stacked image field 200 of FIG. 2, the alignment of the respective projectors is checked sequentially one at a time by sequentially superimposing the marks on the boundaries of the component image fields one at time, as shown in FIGS. 6A-6D, or sequentially filling in the component image fields one at a time. When the marks are superimposed on one of the image fields, locations of the portions of boundary denoted by the marks are determined and compared to the system-calibrated locations of those portions of the boundary, as described above. If it is determined that the respective projector 110 is aligned, the marks are superimposed on the image field for another one of projectors 110, and the alignment is checked. This proceeds one projector at a time until a misaligned projector 110 is identified, at which time it is concluded that the system 100 is misaligned, or until all of the projectors are checked without identifying a misaligned projector, at which time it is concluded that the system 100 is aligned.

For embodiments where projectors 110 are configured to project a tiled image field, such as tiled image field 300 of FIG. 3, the component image fields, e.g., component image fields 310, may be checked sequentially one at a time by sequentially superimposing the marks, as shown in FIGS. 7A-7D, as described above for stacked image fields, or substantially concurrently.

To check projectors 110 concurrently or substantially concurrently, the marks are superimposed on the boundaries of each of the image fields 310 concurrently or substantially concurrently, as shown in FIG. 8, and camera 135 records all the marks. Data corresponding to the superimposed recorded marks is sent to controller 125, and controller 125 determines the locations of portions of the boundary, e.g., relative to camera 135, denoted by the marks. The locations of the portions of boundary are then compared to the system-calibrated locations of those portions of the boundary, as described above.

For one embodiment, projector alignment is checked periodically, e.g., hourly, daily, weekly, etc, without user intervention. For another embodiment, projector alignment is checked upon start up of the projector system without user intervention. Checking projector alignment may, however, be initiated manually by a user inputting an instruction into controller 125 by means of a user interface, such as a keyboard, pressing a button, or the like.

CONCLUSION

Although specific embodiments have been illustrated and described herein it is manifestly intended that the scope of the claimed subject matter be limited only by the following claims and equivalents thereof.

What is claimed is:

1. A method of checking projector alignment in a system of a plurality of projectors, comprising:
   superimposing one or more marks on a boundary of an image field projected by at least one of the projectors;
   recording each of the one or more marks;
   determining locations of one or more portions of the boundary respectively corresponding to the one or more marks based on the recorded one or more marks; and
   comparing the determined location of at least one of the determined locations of the one or more portions to a system-calibrated reference location of the at least one of the determined locations.

2. The method of claim 1 further comprises determining that the system of projectors is out of alignment when the location of the at least one of the determined locations of the one or more portions and the system-calibrated reference location of the at least one of the determined locations differ by more than a certain amount.

3. The method of claim 1 further comprises determining that the at least one of the projectors is in alignment when locations of at least two of the determined locations of the one or more portions and the system-calibrated reference locations of the at least two of the determined locations differ by an amount that is less than or equal to a certain amount.

4. The method of claim 1, wherein superimposing one or more marks on the boundary of the image field projected by at least one of the projectors comprises superimposing marks on one or more corners of the boundary and/or on one or more sides of the boundary.

5. The method of claim 1, wherein superimposing one or more marks on a boundary of an image field projected by at least one of the projectors comprises superimposing one or more marks on boundaries of two or more image fields respectively projected by two or more projectors, wherein the one or more marks have a different color for each of the two or more image fields respectively projected by two or more projectors.

6. The method of claim 1, wherein superimposing one or more marks on a boundary of an image field projected by at least one of the projectors comprises superimposing one or more marks on boundaries of two or more image fields respectively projected by two or more projectors substantially concurrently.

7. The method of claim 1, wherein superimposing one or more marks on a boundary of an image field projected by at least one of the projectors comprises superimposing one or more marks on boundaries of two or more image fields respectively projected by two or more projectors sequentially.

8. The method of claim 1 further comprises superimposing a contrast border on a boundary of at least one of the one or more marks.

9. The method of claim 8, wherein the contrast border is superimposed on the boundary of the at least one of the one or more marks when that mark appears on an image projected by the system of the plurality of projectors.

10. A multiple-projector projection system, comprising:
    a controller;

a plurality of image processors, each of the image processors coupled to the controller;

a plurality of projectors, the projectors respectively coupled to the image processors; and an image-capturing device coupled to the controller;

wherein the controller is configured to cause the multiple-projector projection system perform a method, comprising:

superimposing one or more marks on a boundary of an image field projected by at least one of the projectors by sending data corresponding to the one or more marks from the controller to the image processor coupled to the at least one of the projectors;

recording each of the one or more marks using the camera;

determining locations of one or more portions of the boundary respectively corresponding to the one or more marks based on the recorded one or more marks at the controller; and comparing the determined location of at least one of the determined locations of the one or more portions to a system-calibrated reference location of the at least one of the determined locations at the controller.

11. The multiple-projector projection system of claim 10, wherein the method further comprises determining that the system of projectors is out of alignment when the location of the at least one of the determined locations of the one or more portions and the system-calibrated reference location of the at least one of the determined locations differ by more than a certain amount.

12. The multiple-projector projection system of claim 10, wherein the method further comprises determining that the at least one of the projectors is in alignment when locations of at least two of the determined locations of the one or more portions and the system-calibrated reference locations of the at least two of the determined locations differ by an amount that is less than or equal to a certain amount.

13. A computer-usable medium containing non-transient computer-readable instructions for causing a multiple-projector projection system to perform a method comprising:

superimposing one or more marks on a boundary of an image field projected by at least one of the projectors;

recording each of the one or more marks;

determining locations of one or more portions of the boundary respectively corresponding to the one or more marks based on the recorded one or more marks;

comparing the determined location of at least one of the determined locations of the one or more portions to a system-calibrated reference location of the at least one of the determined locations;

determining that the system of projectors is out of alignment when the location of the at least one of the determined locations of the one or more portions and the system-calibrated reference location of the at least one of the determined locations differ by more than a certain amount; and determining that the at least one of the projectors is in alignment when locations of at least two of the determined locations of the one or more portions and the system-calibrated reference locations of the at least two of the determined locations differ by an amount that is less than or equal to a certain amount.

14. The computer-usable medium of claim 13, wherein, in the method, superimposing one or more marks on a boundary of an image field projected by at least one of the projectors comprises superimposing one or more marks on boundaries of two or more image fields respectively projected by two or more projectors, wherein the one or more marks have a different color for each of the two or more image fields respectively projected by two or more projectors.

15. The computer-usable medium of claim 13, wherein, in the method, superimposing one or more marks on a boundary of an image field projected by at least one of the projectors comprises superimposing one or more marks on boundaries of two or more image fields respectively projected by two or more projectors substantially concurrently or sequentially.

* * * * *